United States Patent
Ikarashi

(10) Patent No.: US 12,166,864 B2
(45) Date of Patent: Dec. 10, 2024

(54) SECURE COMPUTATION APPARATUS, SECURE COMPUTATION METHOD, AND PROGRAM

(71) Applicant: NIPPON TELEGRAPH AND TELEPHONE CORPORATION, Tokyo (JP)

(72) Inventor: Dai Ikarashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 233 days.

(21) Appl. No.: 17/792,148

(22) PCT Filed: Jan. 20, 2020

(86) PCT No.: PCT/JP2020/001683
§ 371 (c)(1),
(2) Date: Jul. 12, 2022

(87) PCT Pub. No.: WO2021/149106
PCT Pub. Date: Jul. 29, 2021

(65) Prior Publication Data
US 2023/0102267 A1     Mar. 30, 2023

(51) Int. Cl.
*H04L 9/08*     (2006.01)
*H04L 9/30*     (2006.01)

(52) U.S. Cl.
CPC ............ *H04L 9/085* (2013.01); *H04L 9/3006* (2013.01)

(58) Field of Classification Search
CPC .............................. H04L 9/085; H04L 9/3006
USPC .......................................................... 380/282
See application file for complete search history.

(56) References Cited

U.S. PATENT DOCUMENTS

2005/0198093 A1*  9/2005  Son ......................... G06F 7/728
                                                              708/625

OTHER PUBLICATIONS

Dan Bogdanov et al., "High-performance secure multi-party computation for data mining applications", International Journal of Information Security, 2012, vol. 11, Sep. 9, 2012, pp. 403-418, total 16 pages.
Ikarashi, "Secure Real Number Operations for Secure Al-O(|p|)-Bit Communication and O(1)-Round Right Shift Protocol-", CSS2019, 2019, 16 pages including English Translation.

* cited by examiner

*Primary Examiner* — Dant B Shaifer Harriman
(74) *Attorney, Agent, or Firm* — XSENSUS LLP

(57) ABSTRACT

A public value $2^\sigma/m$ is obtained, and secure computation of public value division $[x]/(2^\sigma/m)$ using a secret share value $[x]$ and the obtained public value $2^\sigma/m$ is performed, so that a secret share value $[mx]_r$ of a value obtained by right-shifting mx by $\sigma$ bits is obtained and output. Here, x is a real number, $[\cdot]$ is a secret share value of $\cdot$, $\sigma$ is a positive integer that is the number of bits indicating a right shifting amount, and m is a real number.

3 Claims, 3 Drawing Sheets

| PARAMETERS | RECIPROCAL | SQUARE ROOT | RECIPROCAL OF SQUARE ROOT | EXPONENT | LOGARITHM |
|---|---|---|---|---|---|
| L | 0.75 | 1 | 0.5 | 0 | 2 |
| R | 1.125 | 2 | 1 | 2 | 4 |
| a | -2.110464392392 | -0.428141400291061 | -1.696628555353 | 0.015024536909133 | -0.846996273121107 |
| b | 2.434960779692272 | 0.410120079876874 | 1.549574093768 | 0.409852775321580 | 0.784702951333529 |
| c | -0.184132172881249 | -0.012030958432748 | -0.110156883654384 | 0.218572247867126 | -0.035325936062005 |
| d | 9.889932879969575 | -3.717956726390170 | 4.697457085317600 | 6.648269572084330 | -3.026502814095830 |
| f | 1.843813235553150 | -0.643779936629560 | 0.910418285014127 | -0.737980772377752 | -0.522687484745320 |
| g | -2.074844182182560 | 0.447097638921850 | -0.959053601554654 | -0.580995576157224 | 0.378082178902487 |
| h | 9.792700357955590 | 0.232903741490693 | 3.971290599099280 | 1.000000000300262 | -1.687553742176250 |
| i | 0 | 0 | -0.25 | 0.5 | 0 |
| j | -1.113514988782710 | -0.366610117286381 | -0.523183544290677 | -0.470402400605697 | -1.433789157834340 |
| k | 1 | 0 | 0 | 1 | 0 |
| s | 0 | 0 | -0.25 | 0 | 0 |
| m | -0.568915141306530 | -0.106711930503672 | -0.503025809551099 | 0 | -0.748724878178412 |
| n | 16 | 0 | 0 | 20 | 0 |
| o | -4 | 0 | 0 | 0 | 0 |
| p | 2 | 0 | 0 | -4 | 0 |
| q | 11.242088745777110 | 0.765 | -2.971290599099280 | -0.105107110464577 | 2.38 |
| α | 2.6875 | -14.25 | 3 | 3.875 | -1.75 |
| β | -0.90625 | 0.125 | -0.5 | 0.4375 | 0.0625 |
| γ^-1 | 1.378714391910887 | 1.074207336578230 | 1.031634745737520 | 0.901983541508680 | 1.033061782443710 |
| δ | 1 | 2^-3 | 1 | 2^-3 | 2^-3 |
| ζ | 1 | 2^-1 | 1 | 2^-2 | 2^-2 |
| ex | 28 | 28 | 28 | 28 | 27 |
| ey | 29 | 29 | 30 | 29 | 28 |
| ez | 29 | 29 | 30 | 29 | 28 |
| ew | 27 | 28 | 28 | 27 | 28 |
| e'y | 61 | 62 | 62 | 60 | 61 |
| e'x | 63 | 64 | 63 | 61 | 62 |
| e'w | 63 | 60 | 60 | 61 | 59 |

FIG. 2

SECURE COMPUTATION APPARATUS, SECURE COMPUTATION METHOD, AND PROGRAM

CROSS-REFERENCE TO RELATED APPLICATION

The present application is based on PCT filing PCT/JP2020/001683, filed Jan. 20, 2020, the entire contents of which are incorporated herein by reference.

TECHNICAL FIELD

The present disclosure relates to a technology for performing multiplication by a real number value in secure computation.

BACKGROUND ART

NPL 1 discloses a secure computation method for multiplying a secret share value by a public real number value.

CITATION LIST

Non Patent Literature

NPL 1: Dai Ikarashi, "Secure Real Number Operations for Secure AI -O(|p|)-Bit Communication and O(1)-Round Right Shift Protocol-", CSS2019, 2019.

SUMMARY OF THE INVENTION

Technical Problem

However, the secure computation method of NPL 1 has a problem that right shifting is performed in secure computation in addition to multiplication each time the multiplication is performed in order to prevent overflow, and a calculation cost is high.

The present disclosure has been made in view of such a point, and an object of the present disclosure is to reduce a calculation cost of secure computation for multiplying a secret share value by a public real number value.

MEANS FOR SOLVING THE PROBLEM x is a real number, $[\bullet]$ is a secret share value of $\bullet$, $\sigma$ is a positive integer that is the number of bits indicating a right shifting amount, m is a real number, a public value $2^\sigma/m$ is obtained, and secure computation of public value division $[x]/(2^\sigma/m)$ using a secret share value $[x]$ and the obtained public value $2^\sigma/m$ is performed, so that a secret share value $[mx]_r$ of a value obtained by right-shifting mx by $\sigma$ bits is obtained and output.

EFFECTS OF THE INVENTION

Thus, in the present disclosure, because multiplication by a real number m and right shifting by $\sigma$ bits are executed at the same time, a calculation cost can be reduced.

BRIEF DESCRIPTION OF DRAWINGS

FIG. 2 is a table illustrating calculated parameters regarding each of elementary functions.

DESCRIPTION OF EMBODIMENTS

Hereinafter, embodiments of the present disclosure will be described with reference to the drawings.

In the embodiment, a secure computation device receives a secret share value $[x]$ of a real number x, a real number m which is a multiplier, and a positive integer $\sigma$ which is the number of bits indicating a right shifting amount as inputs, and obtains and outputs a secret share value $[mx]_r$ of a value obtained by right-shifting mx by $\sigma$ bits. A secret sharing scheme for a secret share value is not limited, and examples thereof include an additive secret sharing scheme and a Shamir's secret sharing scheme. An example of $[\bullet]$ is a secret share value obtained by performing linear secret sharing on an element on a quotient ring. Further, a public decimal point position is defined for an integer on the ring so that this can be regarded as a fixed-point real number. In the embodiment, the fixed-point real number indicated on the ring in this way is simply expressed as a real number.

Figure 1A:
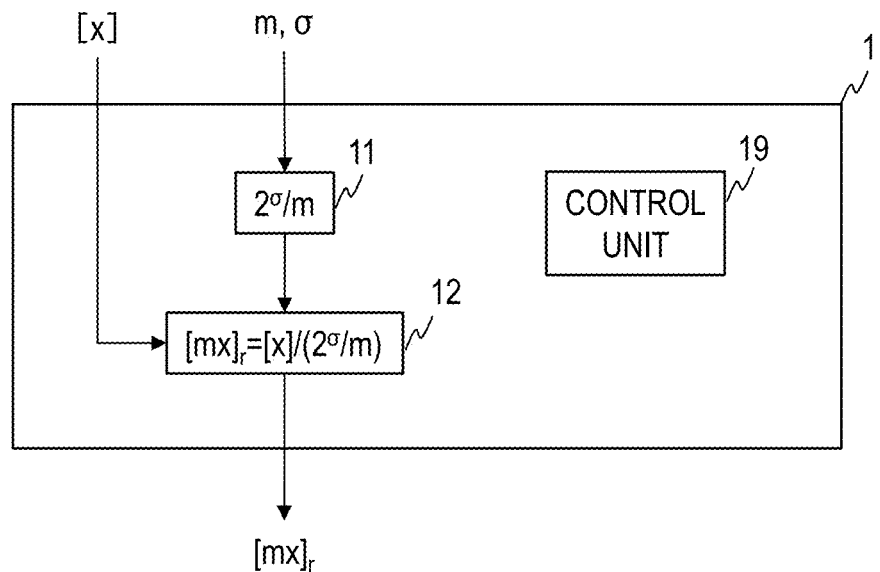
FIG. 1A is a block diagram illustrating a secure computation device of an embodiment.

As illustrated in FIG. 1A, a secure computation device 1 of the embodiment includes a public value calculation unit 11, a secure computation unit 12, and a control unit 19. The secure computation device 1 executes processing under the control of the control unit 19.

Figure 1B:
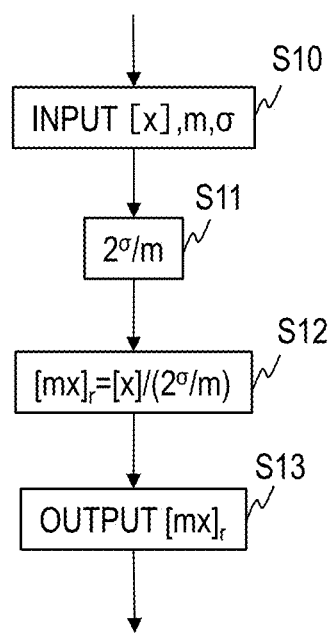
FIG. 1B is a flow diagram illustrating a secure computation method of the embodiment.

As illustrated in FIG. 1B, first, a secret share value $[x]$, a real number m, and a positive integer 6 are input to the secure computation device 1 (step S10). The secret share value $[x]$ is sent to the secure computation unit 12, and the real number m and the positive integer 6 are sent to the public value calculation unit 11.

The real number m and the positive integer 6 are input to the public value calculation unit 11. The public value calculation unit 11 calculates and outputs a public value of $2^\sigma/m$ (step S11).

The secret share value $[x]$ and the public value $2^\sigma/m$ which is output from the public value calculation unit 11 are input to the secure computation unit 12. The secure computation unit 12 performs secure computation of public value division $[x]/(2^\sigma/m)$ using the secret share value $[x]$ and the public value $2^\sigma/m$ which is obtained by the public value calculation unit 11 to obtain and output a secret share value $[mx]_r$ of a value obtained by right-shifting mx by $\sigma$ bits (step S12).

The secure computation device 1 outputs the secret share value $[mx]_r$ (step S13).

Characteristics of Present Embodiment

Normally, in secure computation, when the multiplication of the secret share value $[x]$ by the public real number m and the right shifting of the secret share value $[x]$ by the $\sigma$ bits are performed, the multiplication is performed and then the right shifting is performed or the right shifting is performed and then the multiplication is performed. In this case, a calculation cost for performing the multiplication and a calculation cost for performing the right shifting are incurred. On the other hand, in the present embodiment, the fact that the right shifting is equivalent to division is focused on, the public value $2^\sigma/m$ is first calculated, and secure computation of public value division $[x]/(2^\sigma/m)$ using the secret share value $[x]$ and the obtained public value $2^\sigma/m$ is performed. The value obtained by this secure computation is equivalent to the secret share value $[mx]_r$ of the value obtained by right-shifting the multiplication result mx by $\sigma$ bits. However, the multiplication and the right shifting are achieved at the same time through the secure computation of public value division with a low calculation cost. As a result, the calculation cost can be greatly reduced. Those skilled in the art of secure computation recognize that division is processing having a higher calculation cost than multiplication, and $d_0$ not have an idea of using the division for processing of multiplication. Nevertheless, in the present embodiment, a public value $2°/m$ is calculated focusing on the fact that right shifting is equivalent to division, and secure computation of public value division $[x]/(2°/m)$ is performed, and thus, it is possible to obtain unpredictable remarkable effects that a calculation cost can be reduced as compared with a case in which the multiplication and the right shifting are performed separately. Overflow is a problem based on performance of a processor in which secure computation has been implemented, and the present scheme provides a scheme for solving a problem based on this hardware constraint. Thus, the present scheme does not solve a pure mathematics problem, but solves a hardware implementation problem, and thus has technical characteristics. A value of 6 indicating a right shifting amount is determined according to the number of bits that can be handled by the processor. That is, a public value $2°/m$ is a value determined from requirements on hardware.

Implementation Example

Hereinafter, an algorithm capable of implementing the above-described scheme will be illustrated.

EXAMPLE 1

In Example 1, the secret share value $[x]$ of the real number x is multiplied by one of two public values $m_0$ and $m_1$ depending on a condition $c \in \{0, 1\}$. When the public values $m_0$ and $m_1$ are large, the effective number of bits of a value after multiplication (the number of bits required to express that number in binary) increases to a number that cannot be multiplied any more, and thus, right shifting may be performed. In example 1, efficiency of processing in such a case is improved.

Input: $[x]$, multipliers $m_0$ and $m_1$, secret share value $[c]$ of condition $c \in \{0, 1\}$ Output: $[m_0 x]$ if $c=0$ and $[m_1 x]$ if $c=1$ The secure computation device obtains and outputs secret share values $[m_0 x]$ and $[m_1 x]$ through secure computation using the secret share value $[x]$, the multipliers $m_0$ and $m_1$, and the modulus p (step S21). A specific example of processing of step S21 will be described below.

The secure computation device obtains and outputs a secret share value $[c?m_0 x:m_1 x]$ of $m_c x$ through secure computation using the secret share values $[c]$, $[m_0 x]$, and $[m_1 x]$. That is, the secure computation unit 22 obtains and outputs $[m_0 x]$ when c=0 and obtains and outputs $[m_1 x]$ when c=1 (step S22).

Specific Example of Processing of Step S21

A specific example of processing of step S21 will be described. Here, it is assumed that $d_0 = 1/m_0$ and $d_1 = 1/m_1$ are divisors, p is a modulus of a positive integer, and q is a quotient of positive integers.

The secure computation device obtains and outputs a secret share value $[q]$ of the quotient q of x/p through secure computation using the secret share value $[x]$ and the modulus p (step S211).

The secure computation device obtains and outputs $[m_0 x] = [x/d_0] = [(x+qp)/d_0] - [q]p/d_0$ and $[m_1 x] = [x/d_1] = [(x+qp)/d_1] - [q]p/d_1$ through secure computation using the secret share values $[x]$ and $[q]$, divisors $d_0, \ldots, d_{n-1}$ and the modulus p (step S212). A specific example of processing of step S212 will be described hereinafter.

Specific Example of Processing of Step S212

In the secure computation device, the public value calculation unit 212a obtains and outputs public values $2^{\sigma 0}/m_0$ and $2^{\sigma 1}/m_1$ using the multipliers $m_0$ and $m_1$ and positive integers $\sigma 0$ and $\sigma 1$. Here, $\sigma 0$ and $\sigma 1$ are positive integers that are the number of bits indicating a right shifting amount performed when the multipliers $m_0$ and $m_1$ are large, respectively (step S212a).

The secure computation device performs secure computation of public value division $[x+qp]/(2^{\sigma 0}/m_0)$ and secure computation of public value division $[x+qp]/(2^{\sigma 1}/m_1)$ using the secret share values $[x]$ and $[q]$, the modulus p, and the public values $2^{\sigma 0}/m_0$ and $2^{\sigma 1}/m_1$ which are obtained by the public value calculation unit 212a to obtain and output a secret share value $[(x+qp)m_0]$ of a value obtained by right-shifting $(x+qp)m_0$ by $\sigma 0$ bits and a secret share value $[(x+qp)m_1]$ of a value obtained by right-shifting $(x+qp)m_1$ by $\sigma 1$ bits (step S212b).

The secure computation device obtains and outputs $[m_0 x] = [(x+qp)m_0] - [q]pm_0$ and $[m_1 x] = [(x+qp)m_1] - [q]pm_1$ through secure computation using the secret share values $[(x+qp)m_0]$, $[(x+qp)m_1]$, and $[q]$, the modulus p, and the multipliers $m_0$ and $m_1$ (step S212c).

EXAMPLE 2

In Example 2, any function (for example, an elementary function) is approximated by the polynomial function $f_t(x)$, and further, a secret share value $[f_t(x) - f'_t(x)]$ of a difference $f_t(x) - f'_t(x)$ between a function $f_t(x)$ before right shift and an approximation function $f'_u(x)$ of the function $f_t(x)$ is calculated, a secret share value $[f_t(x) - f'_t(x)]_r$ of $(f_t(x) - f'_t(x))_r$ obtained by right-shifting $f_t(x) - f'_t(x)$ is obtained, and a secret share value $[f_t(x)]$ of the function $f_t(x)$ obtained by adding $f'_t(x)$ to $f'_t(x) - f_t(x)$ is obtained through secure computation of the secret share value $[f_t(x) - f'_t(x)]$, and the secret share value $[f'_t(x)]$. Here, x is a real number, $[\bullet]$ is a secret share value of $\bullet$, n is an integer equal to or greater than 1 (for example, n is an integer equal to or greater than 2), $t=0, \ldots, n-1$, $u=1, \ldots, n-1$, $f_t(x)$ is a function of a real number x, $f'_t(x)$ is an approximation function of the function $f_t(x)$, a secret share value $[f'_0(x)]$ of the approximation function $f'_0(x)$ is $[f'_0(x)] = c_{0,0} + c_{0,1}[x]$, a secret share value $[f'_u(x)]$ of an approximation function $f'_u(x)$ is $[f'_u(x)] = c_{u,0} + c_{u,1}[x] + c_{u,1}2[f_0(x)] + \ldots + [f_{u-1}(x)]$, $c_{t,0}$ is a public value, and $c_{t,1}, \ldots, c_{t,n+1}$ are coefficients. Here, $c_{t,1}, \ldots, c_{t,n+1}$ are values with small effective numbers of bits and are values that $d_0$ not require a shift due to overflow even when $c_{t,1}, \ldots, c_{t,n+1}$ is multiplied. $f_t(x) - f'_t(x)$ is positive. A secret sharing scheme is not limited, and examples thereof include an additive secret sharing scheme and a Shamir's secret sharing scheme. Here, because a magnitude of $f_t(x) - f'_t(x)$ is smaller than a magnitude of $f_t(x)$, it is possible to curb an overflow of the secret share value $[f_t(x) - f'_t(x)]$. Further, because the secret share value $[f_t(x) - f'_t(x)]$ of the difference $f_t(x) - f'_t(x)$ between the function $f_t(x)$ before right shift and the approximation function $f'_u(x)$ of the function $f_t(x)$ is calculated, it is possible to maintain high precision. The overflow is a problem based on performance of a processor in which the secure computation is implemented, and the present scheme provides a scheme for solving a problem based on constraints on this hardware. Thus, the present scheme does not solve a pure mathematics problem, but solves a hardware implementation problem, and thus has technical characteristics. For example, technical characteristics of the processor that overflows when the secret share value [f$_r$(x)] is calculated but does not overflow when the secret share value [f$_r$(x)−f'$_r$(x)] is calculated are remarkable.

The secure computation device receives the secret share value [x]∈[L, R) of the real number x as an input and performs the following secure computation to output a secret share value [f$_{n-1}$(x)] of a target function f$_{n-1}$(x). L and R are real numbers satisfying L<R, and [L, R) indicates a left-closed, right-open interval of L or more and smaller than R. Here, an example in which n=3, a, b, c, d, f, g, h, i, j, k, s, m, n, o, p, q, α, β, γ, δ, and ζ are real numbers, f$_0$(x)=y=δx$^2$+ax, f$_1$(x)=z=y(ζy+b)+cx, f$_2$(x)=w=γ(z(αz+d)+((βx+f)+gx), f'$_0$(x)=ix+j, f'$_1$(x)=ky+sx+m, and f'$_2$(x)=nz+oy+px+q will be described.

Input: [x]∈[L, R)
Set parameters: a, b, c, d, f, g, H, i, j, k, s, m, n, o, p, q, α, β, γ, δ, and ζ
Output: Secret share value [f$_{n-1}$(x)] corresponding to a target function (for example, an elementary function) f$_{n-1}$(x)

1: The secure computation device obtains [y']=[x(δx+a−i)−j] through secure computation of a sum of products and obtains a secret share value [y']$_r$ of y'$_r$ of which a decimal point position is lowered through secure computation of right shift.

2: The secure computation device obtains [y]=[y'+(ix+j)] through secure computation using the secret share value [y']$_r$.

3: The secure computation device obtains [z']=[y(ζy+b−k)+(c−s)x−m] through secure computation of a sum of products, and obtains a secret share value [z']$_r$ of z'$_r$ of which a decimal point position is lowered through right shift.

4: The secure computation device obtains [z]=[z'+(ky+sx+m)] through secure computation using the secret share value [z']$_r$.

5: The secure computation device obtains [w'/γ]=[z(αz+d−n/γ)+(βx+f−o/γ)y+(g−p)x+(H−q)/γ] through secure computation of a sum of products, performs processing operations of steps S10 to S13 in which [x]=[w'/γ] and m=γ, and performs multiplication by γ and lowering of the decimal point position at the same time to obtain [w'].

6: The secure computation device obtains and outputs [w]=[w'+(nz+oy+px+q)] through secure computation.

EXAMPLE 3

In example 3, a secret share value of an exponential function value exp(x) of the secret share value [x] of the real number x is obtained. Because the exponential function has additivity to an input, the input is decomposed into the following three parts.

I. Minimum expected input μ
II. u higher bits x$_0$, . . . , x$_{u-1}$ equal to or higher than t bits after a decimal point of x−μ
III. Number x$_ρ$ indicated by all lower bits than x$_0$ of x−μ exp x=expμ exp $2^{-t}$x$_0$, . . . , exp $2^{u-t-1}$x$_{u-1}$ exp x$_ρ$. exp μ is a public value, exp $2^{-t}$x$_0$, . . . , exp $2^{u-t-1}$x$_{u-1}$ are portions calculated by a table. exp x$_ρ$ is a portion calculated by approximation and is normalized to [0, $2^{-t}$).

Input: [x]
Output: [exp(x)]
Set parameters: t=−1

1: The secure computation device obtains [x']=[x]−μ through secure computation. Here, μ is a minimum value of x that is assumed.

2: The secure computation device extracts bits higher than t bits after a decimal point through bit decomposition in secure computation and performs mod p conversion to obtain [x'$_0$], . . . , [x'$_{u-1}$].

3: The secure computation device sets f$_i$ and ε$_i$ as a mantissa part and an exponential part of exp($2^{i-t}$), where 0≤i<u, through secure computation.

4: The secure computation device obtains $$[f'] = \left[\prod_{0 \le i \le u-1} F_i\right]$$

in which F$_i$=1 when x'$_i$=0 and F$_i$=f$_i$ when x'$_i$=1 for i=0, u−1 through secure computation.

5: The secure computation device calculates [ε'$_i$]:=if [x'$_i$] then $2^{εi}$ else 1 through if-then-else gate of option disclosure with 0≤i<u through secure computation.

6: The secure computation device obtains a product [ε'] of [ε'$_i$] regarding each i through secure computation (ε'=ε'$_0$ . . . ε'$_{u-1}$). This is a power of 2 in an exponential part of a high-order bit part of exp(x').

7: The secure computation device obtains $$[x'_ρ] = [x'] - \sum_{i<u} 2^{i-t}|x'_i|$$

through secure computation. This is a number indicated by a low-order bit part of exp(x').

8: The secure computation device obtains [w] from [x'$_ρ$] through secure computation. Here, w is a polynomial for approximating an exponential function exp x$_ρ$ of x'$_ρ$. The secure computation device uses, for example, the method of Example 2 in which x=x'$_ρ$ to obtain [w].

9: The secure computation device obtains and outputs [w][f'][ε']exp(μ) through secure computation. Here, the secure computation device performs processing operations of steps S10 to S13 in which [x]=[w][f'][ε'] and m=exp(μ) in multiplication of exp(μ), and performs multiplication by exp(μ) and lowering of the decimal point position at the same time to obtain [w][f'][ε']exp(μ).

Example of Calculated Parameters Regarding Each Elementary Function FIG. 2 illustrates calculated parameters in a case in which an elementary function is a reciprocal function, a square root function, a reciprocal function of a square root, an exponential function, and a logarithmic function. ex, ey, and ez indicate decimal point positions of x, y, and z, respectively. Further, e'x, e'y, and e'z indicate decimal point positions of x', y', and z' before right shift, respectively. These decimal point positions indicate bit positions of the decimal point positions counted from the lower bits. A value indicating this bit position starts from 0, and when an e1-st bit counted from a lower bit indicates 1, a decimal point position is represented as e1.

Hardware Configuration

The secure computation device 1 in the embodiment is, for example, a device configured by a general-purpose or dedicated computer including a processor (a hardware processor) such as a central processing unit (CPU), a memory such as a random-access memory (RAM) and a read-only memory (ROM), and the like executing a predetermined program. This computer may include one processor and memory or may include a plurality of processors and memories. This program may be installed in a computer or may be recorded in a ROM or the like in advance. Further, a part or all of processing units may be configured by using an electronic circuit that implements a processing function alone, instead of an electronic circuit (circuitry) that implements a functional configuration by a program being read, like a CPU. Further, an electronic circuit constituting one device may include a plurality of CPUs.

Figure 3:
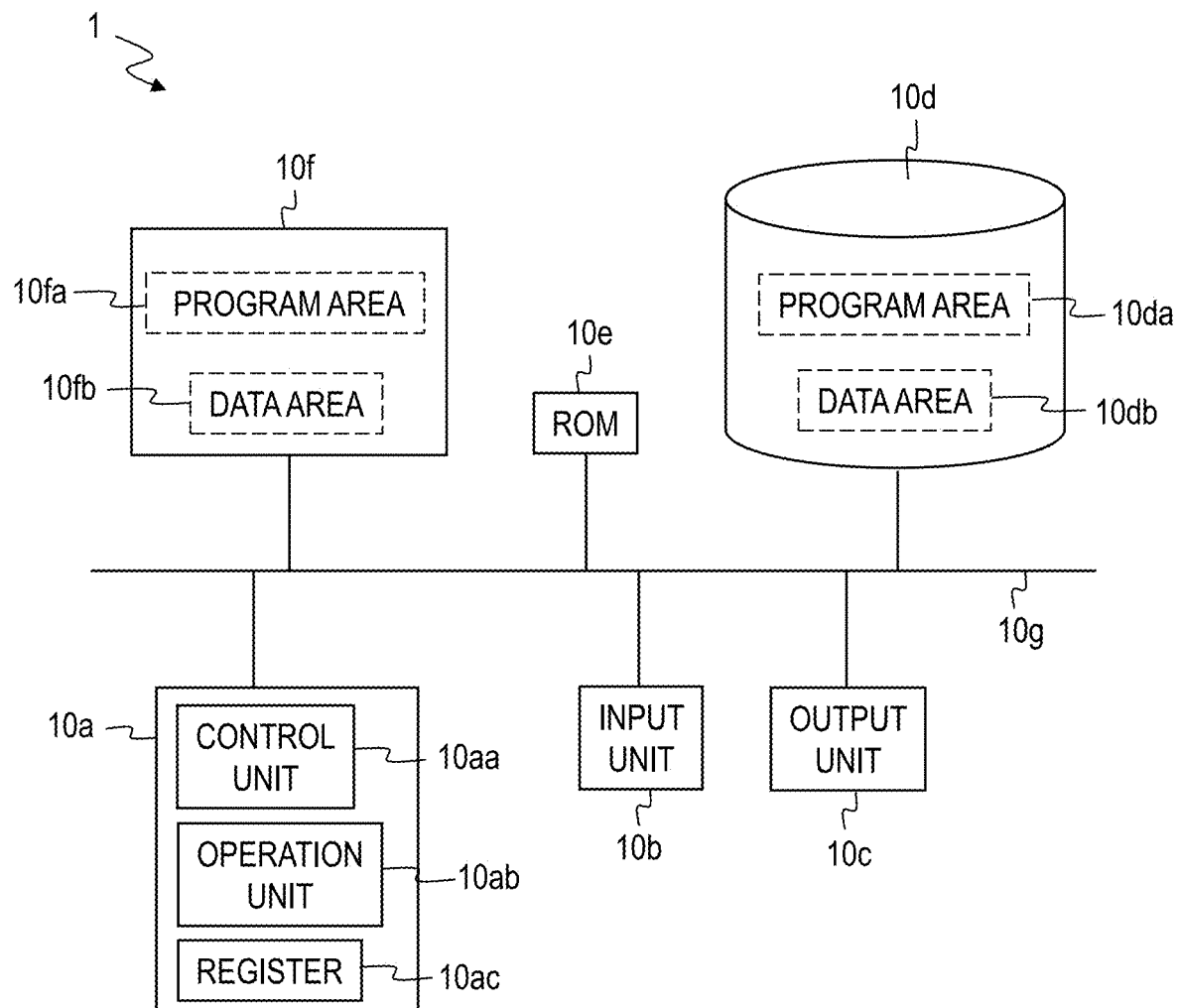
FIG. 3 is a block diagram illustrating a hardware configuration.

FIG. 3 is a block diagram illustrating a hardware configuration of the secure computation device 1 in the embodiment. As illustrated in FIG. 3, the secure computation device 1 of this example includes a central processing unit (CPU) 10a, an input unit 10b, an output unit 10c, a random access memory (RAM) 10d, a read only memory (ROM) 10e, an auxiliary storage device 10f, and a bus 10g. The CPU 10a of this example includes a control unit 10aa, an operation unit 10ab, and a register 10ac, and executes various pieces of operation processing according to various programs read into the register 10ac. Further, the output unit 10c is an output terminal, a display, or the like on which data is output. Further, the output unit 10c is a LAN card or the like controlled by the CPU 10a that has read a predetermined program. Further, the RAM 10d is a static random access memory (SRAM), a dynamic random access memory (DRAM), or the like, and has a program area 10da in which a predetermined program is stored and a data area 10db in which various types of data is stored. Further, the auxiliary storage device 10f is, for example, a hard disk, a magneto-optical disc (MO), a semiconductor memory, or the like, and has a program area 10fa in which a predetermined program is stored and a data area 10fb in which various types of data is stored. Further, the bus 10g connects the CPU 10a, the input unit 10b, the output unit 10c, the RAM 10d, the ROM 10e, and the auxiliary storage device 10f so that information can be exchanged. The CPU 10a writes the program stored in the program area 10fa of the auxiliary storage device 10f to the program area 10da of the RAM 10d according to a read operating system (OS) program. Similarly, the CPU 10a writes various types of data stored in the data area 10fb of the auxiliary storage device 10f to the data area 10db of the RAM 10d. An address on the RAM 10d in which this program or data is written is stored in the register 10ac of the CPU 10a. The control unit 10ab of the CPU 10a sequentially reads out these addresses stored in the register 10ac, reads a program or data from the area on the RAM 10d indicated by the read address, causes the operation unit 10ab to sequentially execute operations indicated by the program, and stores operation results in the register 10ac. With such a configuration, the functional configuration of the secure computation device 1 illustrated in FIG. 1A is implemented.

The above-described program can be recorded on a computer-readable recording medium. An example of the computer-readable recording medium is a non-transitory recording medium. Examples of such a recording medium are a magnetic recording device, an optical disc, a photomagnetic recording medium, and a semiconductor memory.

Distribution of this program is performed, for example, by selling, transferring, or renting a portable recording medium such as a DVD or CD-ROM on which the program has been recorded. Further, this program may be distributed by being stored in a storage device of a server computer and transferred from the server computer to another computer via a network. As described above, the computer that executes such a program first temporarily stores, for example, the program recorded on the portable recording medium or the program transferred from the server computer in a storage device of the computer. When the computer executes the processing, the computer reads the program stored in the storage device of the computer and executes processing according to the read program. Further, as another form of execution of the program, the computer may directly read the program from the portable recording medium and execute the processing according to the program, and further, the processing according to the received program may be sequentially executed each time the program is transferred from the server computer to the computer. Further, a configuration in which the above-described processing may be executed by a so-called application service provider (ASP) type service that implements a processing function only by an execution instruction and result acquisition without transferring the program from the server computer to the computer. It is assumed that the program in the present embodiment includes information provided for processing of an electronic calculator and being pursuant to the program (such as data that is not a direct command to the computer, but has properties defining processing of the computer).

In each embodiment, although the present device is configured by a predetermined program being executed on the computer, at least a part of processing content of thereof may be implemented by hardware.

The present disclosure is not limited to the above-described embodiment. For example, the various processing operations described above may be executed not only in chronological order as described but also in parallel or on an individual basis as necessary or depending on the processing capabilities of the apparatuses that execute the processing operations. In addition, it is obvious that change can be made appropriately without departing from the spirit of the present disclosure.

INDUSTRIAL APPLICABILITY

The present disclosure can be used, for example, for machine learning performed in secure computation while concealing data or for multiplication of real number values in data mining.

REFERENCE SIGNS LIST

1 Secure computation device

The invention claimed is:
1. A secure computation device, comprising:
a public value calculation circuit to obtain a public value $2^\sigma/m$; and
a secure computation circuit to perform secure computation of public value division $[x]/(2^\sigma/m)$ using a secret share value $[x]$ and the public value $2^\sigma/m$, wherein
x is a real number, $[\bullet]$ is a secret share value of $\bullet$, σ is a positive integer that is the number of bits indicating a right shifting amount, and m is a real number, and
the public value calculation circuit obtains and outputs a secret share value $[mx]_r$ of a value obtained by right-shifting mx by σ bits.
2. A secure computation method, comprising:
obtaining, by a public value calculation circuit, a public value $2^\sigma/m$;
performing, by a secure computation circuit, secure computation of public value division $[x]/(2^\sigma/m)$ using a secret share value $[x]$ and the public value $2^\sigma/m$, wherein x is a real number, $[\bullet]$ is a secret share value of •, σ is a positive integer that is the number of bits indicating a right shifting amount, and m is a real number; and obtaining and outputting, by the public value calculation circuit, a secret share value $[mx]_r$ of a value obtained by right-shifting mx by σ bits.

3. A non-transitory computer-readable recording medium storing computer executable instructions which, when executed by a public value calculation circuit and a secure computation circuit, cause the public value calculation circuit and the secure computation circuit to:

obtaining a public value $2^\sigma/m$;

performing secure computation of public value division $[x]/(2^\sigma/m)$ using a secret share value $[x]$ and the public value $2^\sigma/m$, wherein x is a real number, [•] is a secret share value of •, σ is a positive integer that is the number of bits indicating a right shifting amount, and m is a real number; and obtaining and outputting a secret share value $[mx]_r$ of a value obtained by right-shifting mx by σ bits.

* * * * *